United States Patent [19]

Widdowson

[11] 4,375,228
[45] Mar. 1, 1983

[54] TWO-STAGE FLOW RESTRICTOR VALVE ASSEMBLY

[75] Inventor: Richard E. Widdowson, Dayton, Ohio

[73] Assignee: General Motors Corporation, Detroit, Mich.

[21] Appl. No.: 237,246

[22] Filed: Feb. 23, 1981

[51] Int. Cl.³ .................... F16K 31/163; F15D 1/02
[52] U.S. Cl. .................... 138/46; 137/503; 62/210; 138/45
[58] Field of Search ............ 137/503; 62/210; 138/46, 45, 40

[56] References Cited

U.S. PATENT DOCUMENTS

| 800,914 | 7/1907 | Haley | 137/503 |
|---|---|---|---|
| 920,716 | 5/1909 | Beckman | 137/513.3 |
| 1,044,053 | 11/1912 | H uxford | 137/503 |
| 2,318,962 | 5/1943 | Parker | 137/513.3 |
| 2,816,572 | 12/1957 | Pratt | 137/501 |
| 2,984,261 | 5/1961 | Kates | 138/46 |
| 3,180,107 | 4/1965 | Baker et al. | 62/209 |
| 3,296,816 | 1/1967 | Weibel et al. | 62/210 |
| 3,482,415 | 12/1969 | Trask | 62/222 |
| 3,642,030 | 2/1972 | Amick | 138/145 |
| 3,973,410 | 8/1976 | Putman et al. | 62/527 |
| 4,009,592 | 3/1977 | Boerger | 62/222 |

FOREIGN PATENT DOCUMENTS 2741120  3/1979  Fed. Rep. of Germany ........ 138/46

Primary Examiner—John W. Shepperd
Attorney, Agent, or Firm—R. L. Phillips

[57] ABSTRACT

A two-stage flow restrictor valve assembly is disclosed that is adapted to be inserted in a fluid line to reduce the flow therethrough in two stages. The valve assembly is compactly arranged and comprises a minimum of parts including a valve body, a flow restrictor tube, a power rod, a movable valve assembly operated by the power rod against the spring and a single O-ring for sealing.

3 Claims, 10 Drawing Figures

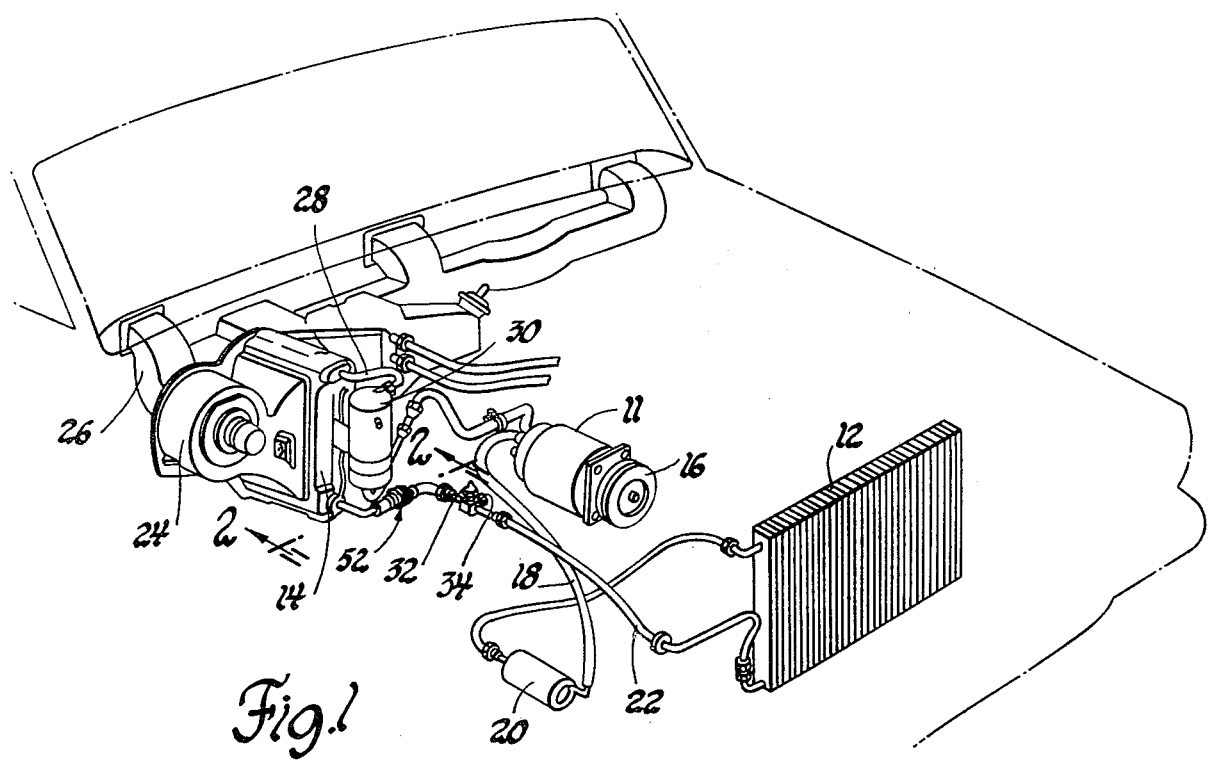
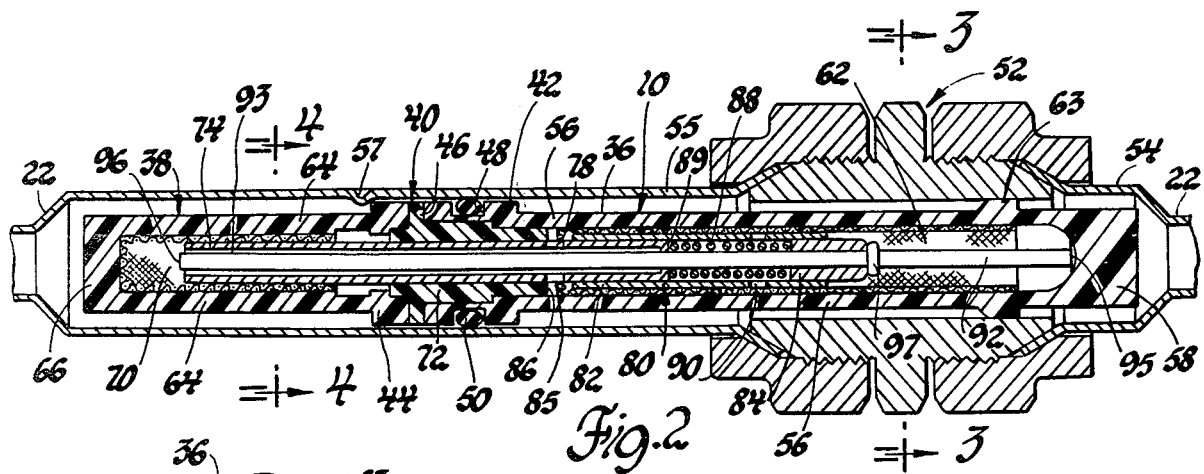
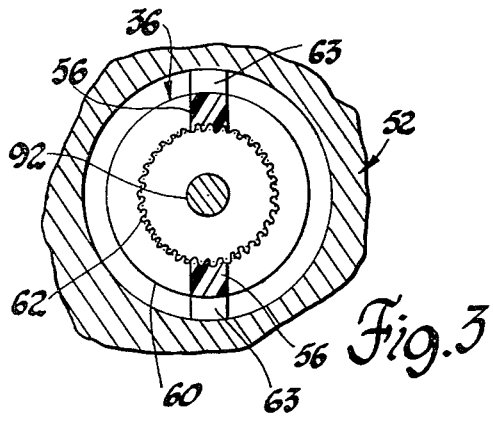
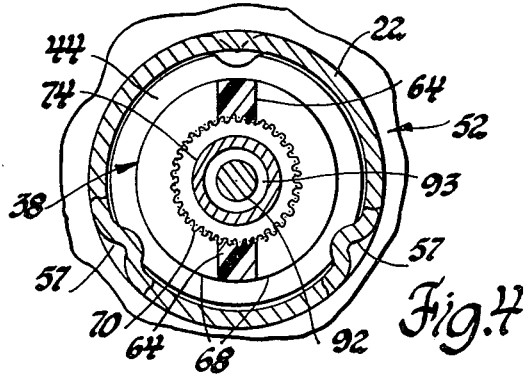

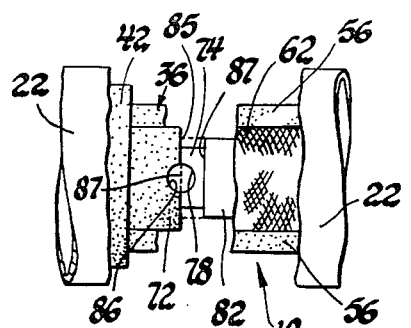
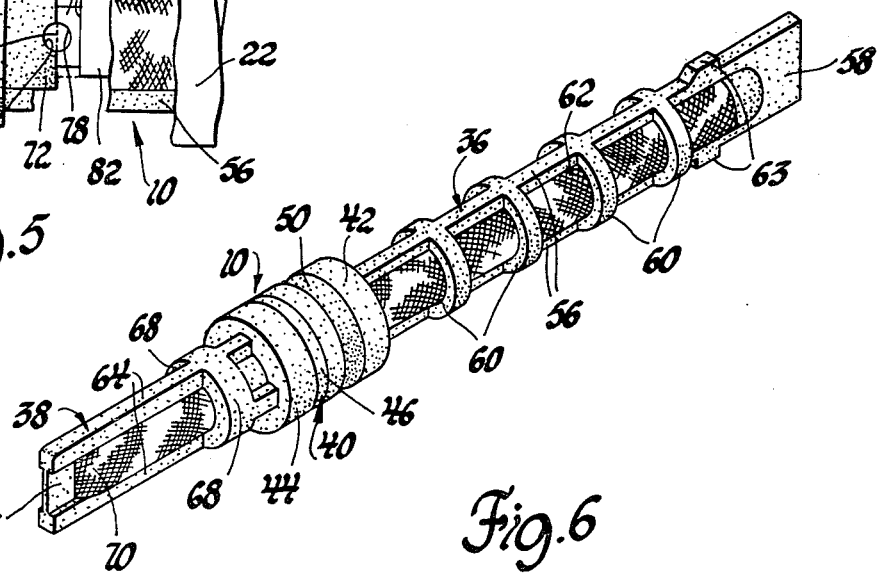
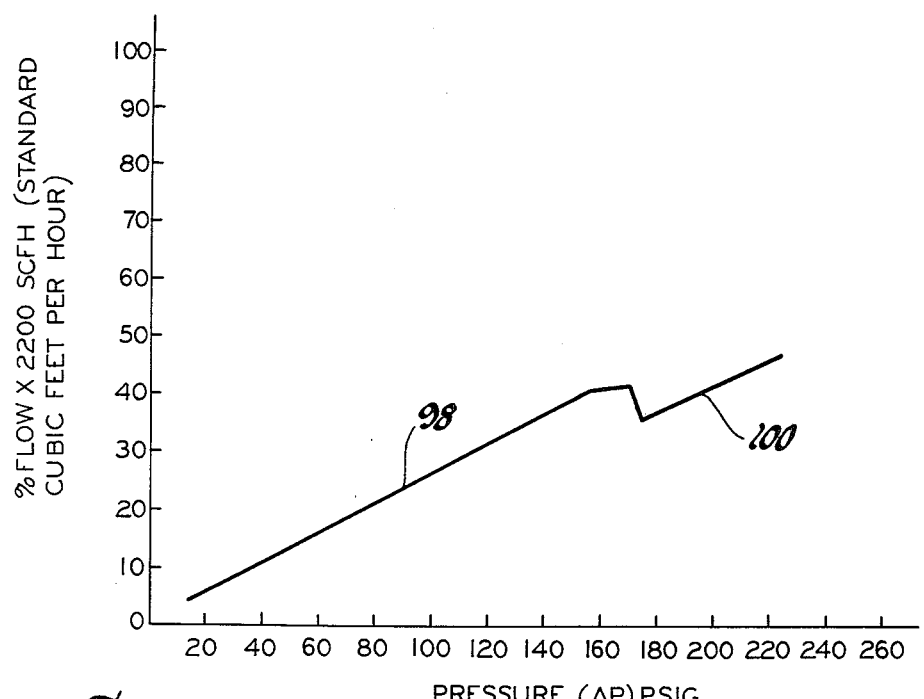

TWO-STAGE FLOW RESTRICTOR VALVE ASSEMBLY

This invention relates to a two-stage flow restrictor valve assembly and more particularly to a two-stage flow restrictor valve assembly having series arranged orifices whose effective operation is sequenced by differential line pressure.

In fluid systems wherein it is desired to restrict the flow in a line, it is common practice to use a simple fixed restriction where possible for such reasons as lack of moving parts, exact sizing, simplicity and low cost. However, this may force an undesirable compromise where substantially improved system efficiency would result if a practical, low-cost, variable size flow restrictor was available.

For example, in automotive air conditioning systems, it is common practice to use a fixed restriction such as an orifice or capillary tube in the high-pressure liquid line between the condenser and evaporator with the refrigerant flow then being dependent on pressure differential and the amount of liquid subcooling. However, it is difficult to size a single fixed restriction for all system flow conditions such as result from the compressor being driven by the engine and thus varying capacity-wise in speed therewith. Also, there are the flow changes that result from changes in ambient conditions. For example, during highway driving under high abient conditions (90°-100° F.) the compressor speed is sufficient to maintain an in-car temperature considered comfortable. But then when the car speed is decreased as in the case of heavy, slow-moving traffic, the compressor speed and therefor capacity is decreased also. The heat load on the condenser will then increase due to a decrease in the ram air flowing across the condenser. This increase in condenser heat load creates a higher temperature and pressure in the refrigerant within the high-pressure side of the system where the condenser is located. This increase of pressure on the high-pressure side of the system forces more liquid refrigerant through the orifice tube into the evaporator located on the low-pressure side of the system. Using a fixed opening in the orifice tube under these conditions may cause an excessive flow of refrigerant to enter the evaporator and compressor than the latter is capable of pumping at that given condition. To overcome this adverse system condition, a means to reduce the orifice tube size would be desirable since reducing the flow of refrigerant would tend to balance the refrigerant flow to the available compressor capacity. For example, it is known that a multiple stage or variable flow restrictor operated by differential pressure can be used to substantial advantage to better control the flow in an automotive air conditioning system as disclosed in U.S. Pat. No. 3,296,816 assigned to the assignee of this invention. There are also other known variable flow devices of this general type as disclosed in U.S. Pat. Nos. 920,716; 2,816,572; 3,482,415; 3,973,410 and 4,009,592.

The present invention is an improvement over those disclosed in the above-identified patents from the standpoint of providing a practical, readily mass producible, two-stage flow restrictor valve assembly of minimum complexity and low cost. This is accomplished with a two-stage flow restrictor valve assembly that is adapted to be easily inserted and sealed at the desired point in the fluid system and in the case of an automotive air conditioning system in the high-pressure liquid refrigerant line between the condenser and evaporator. The valve assembly comprises a valve body that has a sliding seal fit in the line, an inlet side that is adapted to receive fluid at an upstream point in the line and an outlet side that is adapted to deliver the fluid at a downstream point. A restrictor tube is fixed in the valve body between the inlet and the outlet side and has a side opening that continuously connects the inlet side through the tube to the outlet side. A sleeve valve is slidably mounted on the tube for movement between an open position fully uncovering the opening and an orifice effecting position partially closing the opening to define a small orifice of predetermined size. A spring is arranged between the tube and the movable sleeve valve to normally hold the latter in its open position and resist movement thereof to its orifice effecting position. The movable sleeve valve has an upstream side exposed to the fluid pressure on the inlet side and has a port communicating this same pressure with a downstream size thereof so that the sleeve valve is continuously pressure balanced. A power rod engages at an intermediate point along the length thereof with the movable sleeve valve and extends therethrough and further extends with substantial annular clearance through the restrictor tube so as to be exposed at one end to the fluid pressure on the inlet side and at an opposite end to the fluid pressure on the outlet side while communication between the inlet and outlet sides is maintained through this annular clearance. The annular clearance defines a large orifice of predetermined size substantially larger than the small orifice but smaller than the side opening through the tube. As a result, the movable sleeve valve is normally held in its open position to effect a high flow rate range through the line determined by the large orifice. Alternatively, the sleeve valve is moved to its orifice effecting position to reduce the fluid flow through the line to a low flow rate range determined by the small orifice with this occurring at a predetermined pressure differential where the force of the fluid pressure on the inlet side acting on the one end of the rod exceeds the force of the spring and that of the downstream fluid pressure on the outlet side acting in the opposite direction on the opposite end of the rod. As applied to an air conditioning system, the refrigerant flow rate is thus made dependent on the pressure differential across the valve, the amount of liquid subcooling and the compressor discharge pressure. By proper sizing of the two series arranged orifices and the shift point pressure differential, it is possible in a very practical way to reduce the refrigerant flow for better cooling performance such as during idle and in city traffic at high ambient conditions when the compressor speed is reduced and on the other hand, upon acceleration from idle or city traffic provide for higher rate of refrigerant flow with the then increased compressor capacity.

Among the more important structural features in the preferred embodiment of the present invention, it will be appreciated that only the power rod and sleeve valve are required to move and as a unit against the spring yet two exact or precisely sized orifices for flow restriction are alternately provided through combined use of the simple restrictor tube as determined by a predetermined pressure differential acting across the power rod. Moreover, these parts are provided in a very compact arrangement that is readily mass producible at low cost.

These and other objects, advantages and features of the present invention will become more apparent from the following description and drawing in which:

FIG. 1 is a perspective view of an automotive air conditioning system employing the preferred embodiment of the two-stage flow restrictor valve assembly of the present invention.

FIG. 2 is an enlarged, longitudinal sectional view of the two-stage flow restrictor valve assembly installation taken along the line 2—2 in FIG. 1.

FIG. 3 is an enlarged, cross-sectional view taken along the line 3—3 in FIG. 2.

FIG. 4 is an enlarged, cross-sectional view taken along the line 4—4 in FIG. 2.

FIG. 5 is an enlarged view with parts broken away showing the two positions of the sleeve valve member in the two-stage flow restrictor valve assembly in FIG. 2.

FIG. 6 is a perspective view of the two-stage flow restrictor valve assembly in FIG. 2 prior to assembly in the system.

FIG. 7 is a graph showing typical flow characteristics of the two-stage flow restrictor valve assembly in FIG. 2 in use in the automotive air conditioning system in FIG. 1.

Figure 8:
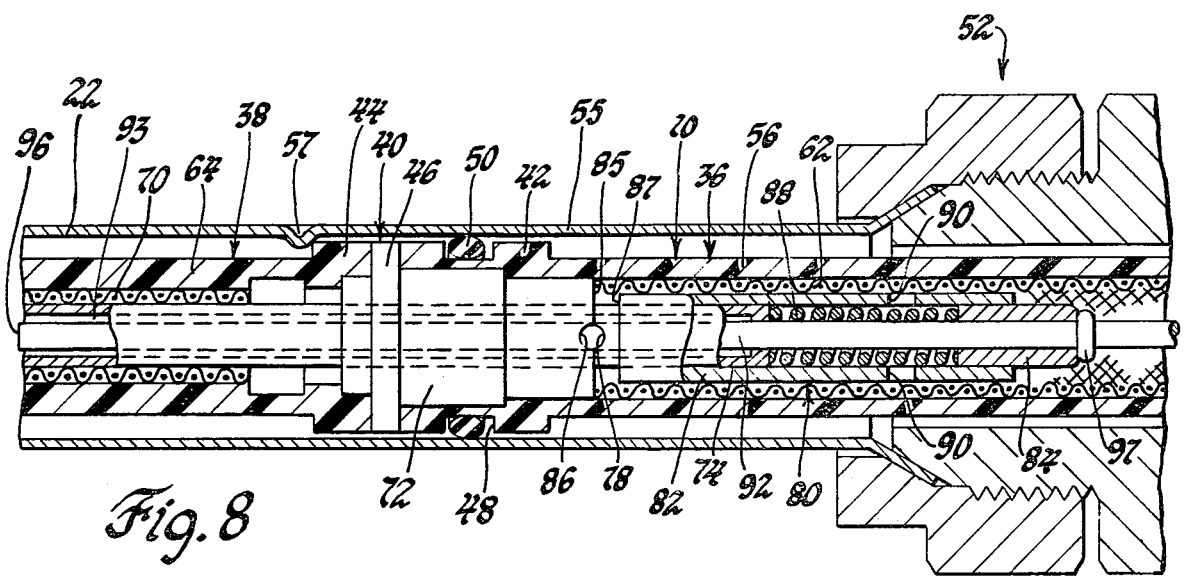
FIG. 8 is an enlarged view with parts broken away and parts in section further showing the open position of the sleeve valve member in the two-stage flow restrictor valve assembly in FIG. 2.
Figure 9:
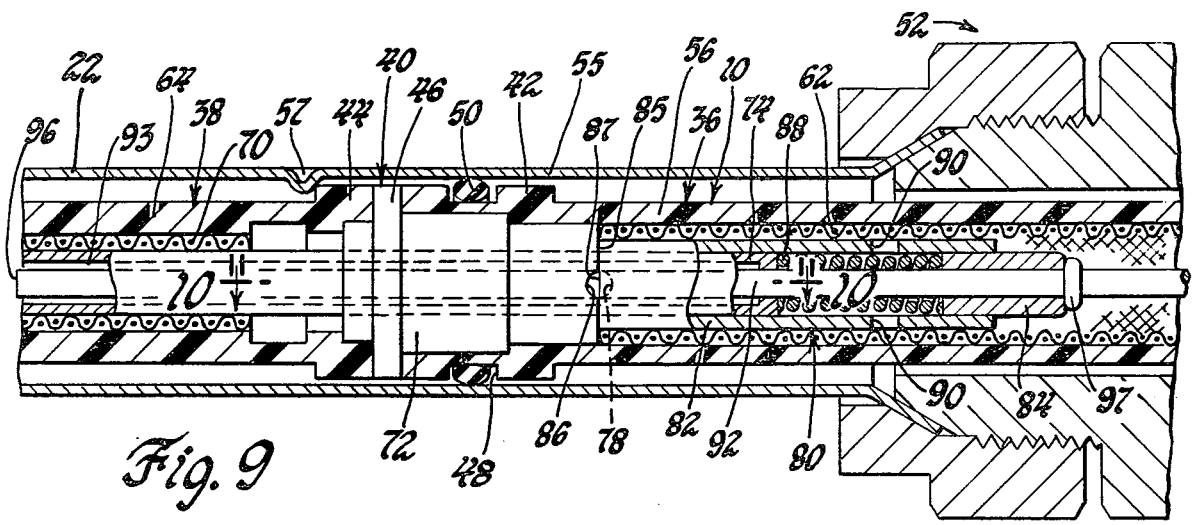
FIG. 9 is an enlarged view similar to FIG. 8 but showing the sleeve valve member in its orifice effecting position.
Figure 10:
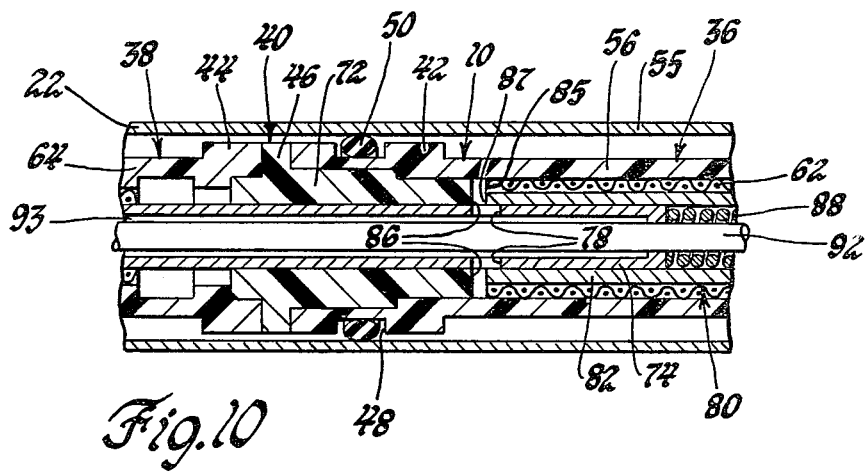
FIG. 10 is a view taken along the line 10—10 in FIG. 9.

Referring to FIG. 1, there is shown a two-stage flow restrictor valve assembly 10 installed for use as an expansion device in an automotive air conditioning system which typically basically comprises a compressor 11, condenser 12 and an evaporator 14. The compressor 11 is driven through an electromagnetic clutch 16 by the vehicle's engine (not shown) and delivers refrigerant at high pressure and in vapor form via a discharge line 18 containing a muffler 20 to the condenser 12 which is located in the air intake stream to the engine compartment. The refrigerant exits the condenser 12 at high pressure but now in liquid form to a high-pressure liquid line 22 in which the two-stage flow restrictor valve assembly 10 is installed immediately upstream of the connection of this line to the evaporator 14. Air is drawn through the evaporator 14 by an electric motor driven blower 24 and is blown at a cooled temperature into the passenger compartment through ducting 26. Low-pressure refrigerant vapor exits the evaporator 14 through a suction line 28 containing an accumulator-dehydrator unit 30 and is returned by this line to the suction side of the compressor 11. The air conditioning system further includes a safety pressure switch 32 for controlling the compressor's clutch 16 and a high-pressure gauge connection 34 both of which are connected in the high-pressure liquid line 22 between the condenser and evaporator. The system thus far described, apart from the two-stage flow restrictor valve assembly 10, is conventional and therefore, further description thereof except for the interaction of this new valve is not believed necessary.

Describing now the details of the two-stage flow restrictor valve assembly 10, it is shown as a complete assembly in FIG. 6 and as-installed in the high-pressure liquid line 22 in FIGS. 2-5 and 8-10. The valve assembly comprises a three-piece injection molded plastic body consisting of an upstream-side part 36, a downstream-side part 38 and an intermediate or spacer part 40. The spacer part 40 is located intermediate of and is welded to the upstream-side and downstream-side parts 36 and 38 to thus form a unitized valve body. The three valve body parts 36, 38 and 40 are provided at their juncture with a cylindrical portion 42, 44, 46 respectively with the cylindrical portion 42 on the upstream-side valve body part 36 being further provided with an outwardly facing annular groove 48 receiving an O-ring seal 50. The cylindrical portions 42, 44 and 46 are of equal diameter and are sized together with the O-ring seal 50 to adapt the valve body for sliding sealed mounting in the high-pressure liquid line 22, this line being provided with a coupling 52 and enlarged and flared ends 54 and 55 and indentations 57 in the end 55 to accommodate and secure such installation. With such adaptation for installation, the valve body 42, 44, 46 presents an upstream side to the right of the O-ring seal 50 as viewed in the drawings for receiving refrigerant at an upstream point in the line 22 from the condenser 12 and a downstream side for the delivering the refrigerant at a downstream point in this line to the evaporator 14.

The upstream-side valve body part 36 has a pair of parallel and diametrically oppositely located longitudinally extending bars 56 which extend from the cylindrical portion 42 and are joined at the opposite end by a transversely extending flat cross-bar 58 which serves as a grasping member for handling of the valve assembly and insertion in the line. The longitudinally extending bars 56 are also joined along their length by a plurality of equally spaced pairs of transverse arcuate bars 60. The bars 56, 58, 60 form a cage to contain a cylindrical nylon filter screen 62 which filters out foreign material while allowing the high-pressure liquid refrigerant to flow into the interior of the valve body. In addition, the axially extending bars 56 are formed with a radially outwardly extending projection 63 adjacent the cross-bar 58 to help locate the valve body at this end centrally in the line at coupling 52. The downstream-side valve body part 38 also has two similar longitudinally extending bars 64 which extend from its cylindrical portion 44 and are joined at their opposite end by a cross-bar 66 and at an intermediate point adjacent the cylindrical portion 44 by a pair of transverse arcuate bars 68. The bars 64, 66, 68 form a cage to contain a cylindrical nylon filter screen 70 which acts to muffle as well as further filter the refrigerant on leaving the valve interior. The valve body spacer part 40 also has a centrally located hollow cylindrical portion 72 having a relatively long portion thereof tightly telescopically received in the cylindrical portion 42 of the upstream-side valve body part 36 and a relatively short portion thereof tightly telescopically received in the cylindrical portion 44 of the downstream-side valve body part 44 to thus accurately locate the valve body parts relative to each other.

A hollow metal flow restrictor or capillary tube 74 is fixed by press-fitting in the hollow cylindrical portion 72 of the valve body spacer part 40 and extends at an upstream end thereof into the interior of the upstream located filter screen 62 and at a downstream end into the interior of the downstream located filter screen 70, the tube thus extending between the inlet and outlet sides of the valve assembly. The tube 74 on its upstream side is provided with a pair of diametrically opposed openings or cross-holes 78 by which the inlet side is continuously connected through the tube to the outlet side. A two-piece metal sleeve valve assembly 80 is slidably mounted on the exterior of the tube 74 on its upstream side and comprises a sleeve member 82 which is directly slidably mounted thereon and a plug member 84 which is press-fitted in the upstream end of the sleeve member a predetermined distance at assembly to establish a certain spring load as will be described in more detail later.

The upstream edge 85 of the sleeve 72 of the valve body spacer member 40 is provided with diametrically opposed semi-circular notches 86 which align with the tube openings 78 such that when the sleeve valve assembly 80 is in an open position as shown in solid-line in FIG. 5 and again in FIG. 8, the tube openings 78 are fully uncovered or open. But when the sleeve valve assembly 80 is moved leftward and engages at its left-hand edge 87 with the valve body spacer sleeve edge 85 as shown in phantom-line in FIG. 5 and in solid line in FIGS. 2, 9 and 10, the tube openings 78 are then partially closed thereby and the semi-circular openings 86 cooperating with the sleeve valve member edge 87 then define a small effective orifice whose size can be accurately determined. A helical coil spring 88 is mounted within the sleeve valve element 82 between its plug member 84 and the upstream end 89 of the tube 74 which is flanged inwardly to provide a seat therefor. The plug member 84 is press-fitted a certain distance into the sleeve valve member 82 at assembly so as to preload the spring 88 a predetermined amount to normally hold the sleeve valve assembly 80 in the open position shown and prevent movement thereof to its orifice effecting position where it engages the valve body sleeve spacer end 85 until a predetermined force (pressure differential) is reached as will be described in more detail later. The sleeve valve assembly 80 has its upstream or exterior side exposed to the pressure on the valve's inlet side and further has a pair of diametrically opposed openings or cross-holes 90 connecting this same pressure with the interior of the downstream side thereof whereby the sleeve valve assembly is continuously pressure balanced.

A solid metal rod 92, which shall be referred to as a power rod because of its function, is utilized to transmit a fluid pressure produced operating (closing) force to the sleeve valve assembly. The power rod 92 extends from the upstream valve side within the upstream located filter screen 62 through a central hold in the sleeve valve assembly plug member 84 in close fitting relationship therewith and further extends with a sliding sealing fit through the inwardly flanged end 89 of the flow restrictor tube 74 and then with a substantial annular clearance 93 through and slightly past the downstream end of the hollow flow restrictor tube to within the downstream located filter screen 70. The power rod 92 is thus exposed at an upstream end 95 thereof to the pressure on the upstream valve side and is exposed at a downstream end 96 thereof (opposite end) to the pressure on the downstream valve side past the flow restrictor tube. Force is transmitted to the sleeve valve assembly 80 by the power rod 92 being formed at an intermediate point along its length with an integral radially outwardly extending annular collar 97 which directly abuts with the upstream end of the sleeve valve assembly plug member 84.

In the valve assembly, fluid communication is always maintained between the inlet and outlet side of the valve by the flow restrictor tube openings 78 and the annular clearance 93 between the power rod 92 and the interior of the flow restrictor tube 74. The annular clearance 93 is utilized to define a large orifice with a predetermined size substantially larger than that of the small effective orifice defined by the semi-circular openings 86 when the sleeve valve assembly engages the valve body spacer sleeve end 85 in its orifice effecting position. However, the large orifice (annular clearance) 93 is smaller than the effective side opening through the flow restrictor tube provided by the cross-holes 78 when fully uncovered by the sleeve valve assembly in its open position. As a result, the sleeve valve assembly 80 when normally spring held in its open position effects a high flow rate range through the line as determined by the then effective large orifice 93. Alternatively, the sleeve valve assembly 80 is movable to its small orifice effecting position to reduce the flow rate through the line to a low range as determined by the small orifice (semi-circular openings) 86 at a predetermined pressure differential where the force of the fluid pressure on the inlet side acting on the upstream end 95 of the power rod exceeds the force of the spring 88 and that of the fluid pressure on the outlet side acting in the opposite direction on the downstream end 96 of the power rod.

With such two-stage flow restrictor operating in the automotive air conditioning system shown, when the high-side pressure reaches a given value the flow into the low side is reduced by shifting of the sleeve valve member 82 from its open position to its orifice effecting or partially closed position across the flow restrictor tube openings 78 thereby decreasing the refrigerant flow as determined by the small effective orifice 86. This position is maintained until the system pressure differential is reduced by more external condenser cooling or an increase of compressor speed which would cause the sleeve valve element 82 to return to its open or full flow position to allow the large orifice 92 to then become effective. A pressure differential (high-side liquid vs. low-side vapor/liquid) required to shift the sleeve valve will vary as the design of the air conditioning or refrigerant system varies. Some systems will require a shift for example at 170–175 psi $\Delta P$ and others slightly higher. This is based on air flow across the condenser, compressor sizes, speed, etc. An average system should perform well with a shift point in the vicinity of 175 psi $\Delta P$ but, of course, each system would be evaluated on its own merits and characteristics. With low ambient (50°–85° F.) usages, full flow would be in order. With ambients above that range, a lesser flow would be more practical from a system performance level. In FIG. 7, there is shown a typical flow curve resulting from use of the two-stage flow restrictor valve assembly 10 in the air conditioning system shown. As shown by the flow curve, the flow rate is provided in two stages or ranges namely a low flow rate range 98 and a high flow rate range 100 with the transition or shift point occurring at 170–175 psi $\Delta P$ which was found to be the most optimum change between low and high flow rates for best system efficiency.

Having described the preferred embodiment of the two-stage flow restrictor valve assembly according to the present invention and a particularly useful application thereof, it will be understood by those skilled in the art that the desired operation has been obtained with a very compact arrangement having few and simple parts, and particularly few moving parts. In the preferred construction, there is basically a valve body such as can be formed from three parts, a restrictor tube, a movable valve assembly including control sleeve and adjustment plug, a spring and a single seal for sealing. But it will also be understood by those skilled in the art that the above-described preferred embodiment is illustrative of the invention and may be modified within the scope of the appended claims.

The embodiments of the invention in which an exclusive property or privilege is claimed are defined as follows:

1. A two-stage flow restrictor valve assembly adapted to be inserted in a fluid flow line to reduce the flow therethrough in two stages, said valve assembly comprising a valve body having an inlet side adapted to receive fluid at an upstream point in the line and an outlet side adapted to deliver the fluid at a downstream point in the line, a hollow tube fixed in said valve body between said inlet side and outlet side, said tube having an opening continuously connecting said inlet side through said tube to said outlet side, valve means movable between an open position fully uncovering said opening and an orifice effecting position partially closing said opening to define a small effective orifice of predetermined size, an abutment engaged by said valve means to determine said orifice effecting position, a spring operatively arranged between said tube and valve means normally holding the latter in said open position and resisting movement thereof to said orifice effecting position, said valve means having an upstream side exposed to fluid pressure on said inlet side and passage means communicating this same pressure with a downstream side thereof whereby said sleeve valve means is continuously pressure balanced, a rod engaging with said valve means and extending with substantial annular clearance through said tube so as to be exposed at one end to the fluid pressure on said inlet side and at the opposite end to the fluid pressure on said outlet side while communication between said inlet side and outlet side is maintained through said annular clearance, and said annular clearance defining a large effective orifice of predetermined size substantially larger than said small orifice but smaller than the opening through said tube whereby said valve means is normally held in said open position to effect flow control by said large orifice and is moved to its orifice effecting position to effect flow control by said small orifice at a predetermined pressure differential where the force of the fluid pressure on said inlet side acting on said one end of said rod exceeds the force of said spring and that of the fluid pressure on said outlet side acting in the opposite direction on said opposite end of the rod.

2. A two-stage flow restrictor valve assembly adapted to be inserted in a fluid flow line to reduce the flow therethrough in two stages, said valve assembly comprising a valve body having an inlet side adapted to receive fluid at an upstream point in the line and an outlet side adapted to deliver the fluid at a downstream point in the line, a hollow tube fixed in said valve body between said inlet side and outlet side, said tube having a side opening continuously connecting said inlet side through said tube to said outlet side, sleeve valve means slidably mounted on said tube for movement between an open position fully uncovering said opening and an orifice effecting position partially closing said opening to define a small effective orifice of predetermined size, an abutment engaged by said sleeve valve means to determine said orifice effecting position, a spring operatively arranged between said tube and sleeve valve means normally holding the latter in said open position and resisting movement thereof to said orifice effecting position, said sleeve valve means having an upstream side exposed to fluid pressure on said inlet side and having a side opening communicating this same pressure with a downstream side thereof whereby said sleeve valve means is continuously pressure balanced, a rod engaging with said sleeve valve means and extending therethrough and further extending with substantial annular clearance through said tube so as to be exposed at one end to the fluid pressure on said inlet side and at the opposite end to the fluid pressure on said outlet side while communication between said inlet side and outlet side is maintained through said annular clearance, and said annular clearance defining a large effective orifice of predetermined size substantially larger than said small orifice but smaller than the opening through said tube whereby said sleeve valve means is normally held in said open position to effect a high flow rate range through the line determined by said large orifice and is moved to its orifice effecting position to reduce the fluid flow through the line to a low flow rate range determined by said small orifice at a predetermined pressure differential where the force of the fluid pressure on said inlet side acting on said one end of said rod exceeds the force of said spring and that of the fluid pressure on said outlet side acting in the opposite direction on said opposite end of the rod.

3. A two stage flow restrictor valve assembly adapted to be inserted in a fluid flow line to reduce the flow therethrough in two stages, said valve assembly comprising a valve body having an inlet side adapted to receive fluid at an upstream point in the line and an outlet side adapted to deliver the fluid at a downstream point in the line, a ring seal retained on said valve body adapted to seal said valve body in the fluid flow line between said upstream and downstream side, a hollow tube fixed in said valve body between said inlet side and outlet side, said tube having cross-holes continuously connecting said inlet side through said tube to said outlet side, sleeve valve means slidably mounted on said tube for movement between an open position fully uncovering said cross-holes and an orifice effecting position partially closing said cross-holes to define a small effective orifice of predetermined size, said valve body having an abutment engaged by said sleeve valve means to determine said orifice effecting position, a helical coil spring operatively arranged between said tube and sleeve valve means normally holding the latter in said open position and resisting movement thereof to said orifice effecting position, said sleeve valve means having an upstream side exposed to fluid pressure on said inlet side and having a side opening communicating this same pressure with a downstream side thereof whereby said sleeve valve means is continuously pressure balanced, a rod engaging at an intermediate point along the length thereof with said sleeve valve means and extending therethrough and further extending with substantial annular clearance through said tube so as to be exposed at one end to the fluid pressure on said inlet side and at the opposite end to the fluid pressure on said outlet side while communication between said inlet side and outlet side is maintained through said annular clearance, and said annular clearance defining a large effective orifice of predetermined size substantially larger than said small orifice but smaller than said cross-holes whereby said sleeve valve means is normally held in said open position to effect a high flow rate range through the line determined by said large orifice and is moved to its orifice effecting position to reduce the fluid flow through the line to a low flow rate range determined by said small orifice at a predetermined pressure differential where the force of the fluid pressure on said inlet side acting on said one end of said rod exceeds the force of said spring and that of the fluid pressure on said outlet side acting in the opposite direction on said opposite end of the rod.

* * * * *